United States Patent [19]

Crew et al.

[11] Patent Number: 4,804,515
[45] Date of Patent: Feb. 14, 1989

[54] DISTRIBUTED MICROPROCESSOR BASED SENSOR SIGNAL PROCESSING SYSTEM FOR A COMPLEX PROCESS

[75] Inventors: Albert W. Crew, Pittsburgh; James A. Neuner, Richland Township; Gilbert W. Remley, Blawnox; Robert E. Hager, Penn Hills; George M. Chambers, North Huntingdon; Eric A. Delava, Monroeville; Susan A. Wilbur, Wilkins Township; Thomas J. Kenny, Pittsburgh; James F. Sutherland, Plum Boro, all of Pa.

[73] Assignee: Westinghouse Electric Corp., Pittsburgh, Pa.

[21] Appl. No.: 666,696

[22] Filed: Oct. 31, 1984

[51] Int. Cl.⁴ ............................................. G21C 7/36
[52] U.S. Cl. .................................. 376/216; 376/215; 364/492
[58] Field of Search ................ 376/216, 217; 364/527, 364/492

[56] References Cited

U.S. PATENT DOCUMENTS 4,079,236  3/1978  Graham .............................. 376/255
4,434,132  2/1984  Cook .................................. 376/215
4,574,068  3/1986  Hill .................................... 376/215

*Primary Examiner*—Donald P. Walsh
*Attorney, Agent, or Firm*—D. C. Abeles

[57] ABSTRACT

Signals from redundant sensors located throughout a pressurized water reactor (PWR) nuclear power plant are processed in four independent channel sets each of which includes a plurality of independent microcomputers which calibrate, convert to engineering units and calculate partial trip signals and engineered safeguard actuation signals from the sensor signals for use in the conventional voting logic of a plant protection system. The primary and secondary partial trip and engineered safeguard actuation functions associated with various postulated abnormal events are allocated to different independent microcomputers in the channel set for reliability. A test unit common to the channel set automatically, rapidly bypasses and tests each protection function independently while the other protection functions in the channel set remain on-line and also continually tests each microcomputer through a dummy test function performed along with the assigned protection functions. Signals representative of the analog value of the sensor signals are stored by the microcomputers and are transmitted by a serial data link through a common electrical isolation unit to a common analog output device for use by the plant control and monitoring systems under the control of a communication processor common to a group of microcomputers in the channel set.

18 Claims, 4 Drawing Sheets

DISTRIBUTED MICROPROCESSOR BASED SENSOR SIGNAL PROCESSING SYSTEM FOR A COMPLEX PROCESS

BACKGROUND OF THE INVENTION

1. Field of the Invention

This invention relates to a method and apparatus for processing the signals generated by sensors monitoring selected parameters in a complex process such as a nuclear reactor. In particular, it relates to such a method and apparatus which utilizes a plurality of independent, digital, signal processors arranged in a number of redundant channel sets with each signal processor in each channel set generating one or more digital signals suitable for use in a process protection system and analog signals suitable for use in surveillance and control systems, but with related signals generated by different, independent signal processors to enhance system reliability.

2. Prior Art

In a complex process, such as a nuclear power plant, numerous sensors are provided to measure various physical conditions in the process, such as for example, pressures, temperatures, flows, levels, radiation, and the state of various components, such as, the position of valves and whether a pump is operating or not. These measurements are generally used to perform three different functions: process control, surveillance and protection. Process control involves automatic or semi-automatic regulation of process conditions to achieve the desired result. Surveillance encompasses monitoring of process conditions to determine that the desired results are being achieved. Protection is concerned with automatic response to abnormal conditions in the process to prevent operating conditions from exceeding predetermined design limits and to take steps to mitigate the adverse effects of operation outside the design limits. In the case of a nuclear power plant in particular, the protection function is the most demanding of the three. In order to assure reliability of the protection system, redundant sets of critical sensors are provided. In order to improve the availability of the plant, correlation between the signals produced by the redundant sensors is made a prerequisite to initiation of the response to thereby reduce the probability of spurious interruption of normal operations. For instance, typically four redundant sets of sensors are provided, and an indication by at least two out of the four sensors is required to actuate the emergency or safety system.

Some of the critical process conditions can be measured directly, such as pressurizer pressure in the case of a pressurized water reactor (PWR). Others are calculated from measured parameters, such as the departure from nucleant boiling ratio, (DNBR) in the PWR. In either case, the existing condition is compared with a preselected limiting value, and if the limit is exceeded, a digital signal is generated. These digital signals will be referred to as protection system actuation signals and include trip signals which are used to activate a system which shuts down or "trips" the reactor and engineered safeguard actuation signals which are used to initiate the operation of other plant emergency systems as is well known in the art. Since more than one such actuation signal is required to initiate the response, they are referred to as "partial trips" or "partial engineered safeguard actuation signals".

In the typical prior art system, the sensor signals are grouped for processing in channel sets with each channel set including one sensor signal from each set of redundant sensor signals, although in instances where a particularly expensive sensor is required to generate a signal, such a signal may not be included in every channel set. As previously mentioned, a common arrangement is to provide four redundant sensors for most parameters, which therefore, are arranged in four channel sets for processing. In the prior art systems, each channel set includes a number of analog circuits each of which converts the applied sensor signal(s) to the appropriate range, calculates the desired parameter from the measured values where necessary, compares the resultant signal with a selected limit value and generates a protection system actuation signal when the limit is exceeded. Typically, the inputs to the analog circuits are provided with surge protection, electrical isolation and a buffer stage. The outputs of the analog circuits are bistables which provide a fail safe indication of a partial trip or engineered safeguard actuation signal by remaining active under normal conditions and by going inactive when the appropriate limit is exceeded.

In the typical prior art protection system, the four partial trip and partial engineered safeguard actuation signals from each channel set for each parameter are applied to two redundant logic circuits which each perform the selected voting logic, such as two out of four as previously mentioned, on the partial protection system actuation signals. If two out of four of the corresponding partial actuation signals in either of the two logic circuits are inactive, appropriate emergency and safety control systems are actuated.

An example of a prior art protection system is shown in commonly assigned U.S. Pat. No. 3,888,772. This system includes a semi-automatic tester for the voting logic which is described in commonly owned U.S. Pat. No. 3,892,954. To test the voting logic, the partial protection system actuation signals are removed from the voting logic for all of the actuation functions in one logic train and then an operator manually positions a selector switch so that preprogrammed test signals are rapidly and automatically applied to one logic module in the train being tested. Upon the completion of the test, the operator advances the selector switch to the next logic module. The duration of the test signals is so short that the actuation devices do not have time to react to the actuation signals generated and monitored by the tester, however, as an extra precaution, and to provide the capability of manually generating test signals, bypass breakers can be provided to avoid undesired actuation of the emergency and safety actions.

A more recent form of an integrated protection system for a nuclear power plant is described in commonly owned U.S. Pat. No. 4,434,132 entitled "Power Supply with Nuclear Reactor". In this system, the redundant partial actuation signals generated by analog circuits are applied to four separate logic trains each of which performs the voting logic. The voting logic in each logic train or channel set is carried out in part by a microcomputer which exchanges information on partial actuations with a microcomputer in each of the other channel sets through fiber optic data links. If one of the sensors is out of service, its logic module in the assigned channel set can be bypassed singly, and the voting logic in the other channel sets for that actuation function only is changed by the associated microcomputer to two out of three. Each of the channel sets also contains a second microprocessor which monitors the status of the other channel sets and initiates bypassing of the entire channel set during testing of the individual actuation functions. A modification of this integrated protection system utilizing pulse logic is described in commonly owned U.S. patent application Ser. No. 546,604 filed on Oct. 17, 1983 and entitled "Pulsed Multichannel Protection System with Saturable Core Magnetic Logic Units".

All of these prior art systems utilize analog circuits for generating the partial trip and partial engineered safeguard actuation signals wilh all the attendant shortcomings of such circuits including: size, cost, power consumption, heat generation, stability, limited life and inflexibility.

SUMMARY OF THE INVENTION

The present invention overcomes the shortcomings of the prior art by replacing the analog circuits with a plurality of independent, digital signal processors for generating the trip and engineered safeguard actuation signals in each channel set. At least some of the digital signal processors in each channel set generate more than one protection system actuation signal, however, the actuation functions are allocated between processors in a channel set so that related actuation functions are assigned to different processors. More specifically, some of the actuation functions are a primary indication of a particular event in the complex process and others are secondary indications. The primary indication provides rapid response to a particular abnormal condition while the secondary indication, which also initiates the required action, may be slower in response. For instance, in the event of a break in the primary coolant system of a PWR pressurizer pressure, which will drop instantly, is a primary indication of this emergency condition which requires immediate action. Reactor coolant temperature is a secondary indication of this event, but would not be effected as rapidly. According to the invention, the partial trip signals based upon pressurizer pressure and reactor coolant temperature are generated in separate independent signal processors so that failure of either signal processor leaves the other to initiate a reactor trip. Each of the trip signals is applied to a separate output line having its own protection grade isolation so that failures do not propogate from one part of the system to another.

Each of the digital signal processors cyclically performs each of the assigned trip and engineered safeguard actuation functions utilizing the applied sensor signals. In order to continually check the operation of each individual processor, a tester/bypass unit in each channel set repetitively generates a ramp signal which is applied as an additional sensor input to each signal processor in the channel set. The signal processors all generate a test actuation signal when the ramp signal reaches a preset value. Failure of a processor to generate the test actuation signal in response to the ramp signal generates an alarm signal. The tester/bypass unit also, upon command, automatically individually tests each of the operational trip and engineered safeguard actuation functions in the channel set. This is accomplished by replacing the sensor signals with test signals selected to generate the trip or engineered safeguard actuation signal. The function is bypassed during this type of testing by continuously generating a normal output signal on the associated output line while the trip or engineered safeguard actuation signal is applied to the test/bypass unit for confirmation of function operability. The test is completed very rapidly and the remaining actuation functions in the channel set remain on line during the test. Upon completion of the test, the test signal is raised to an extreme value to verify that it has in fact been disconnected.

As another aspect of the invention, the measured or calculated process parameter signals generated by the digital signal processors in generating the protection system actuation signals are outputed as analog signals for use in the reactor control and/or surveillance systems and by the plant computer. In order to eliminate the necessity for individual isolation circuits in the output lines for each one of these analog signals, the analog signals in each channel set are transmitted serially over a data link system to a common output device through a single isolation circuit. Sequencing of this data transfer is controlled by a common communications digital signal processor. As a practical matter, the digital signal processors in each channel set may be divided into groups each with its own communications digital signal processor for transmitting the parameter signals over a data link and through a common isolation circuit to the one common parameter signal output device.

BRIEF DESCRIPTION OF THE DRAWINGS

A more detailed understanding of the invention can be gained from the following description read in conjunction with the accompanying drawings in which.

DESCRIPTION OF THE PREFERRED EMBODIMENT

Figure 1:
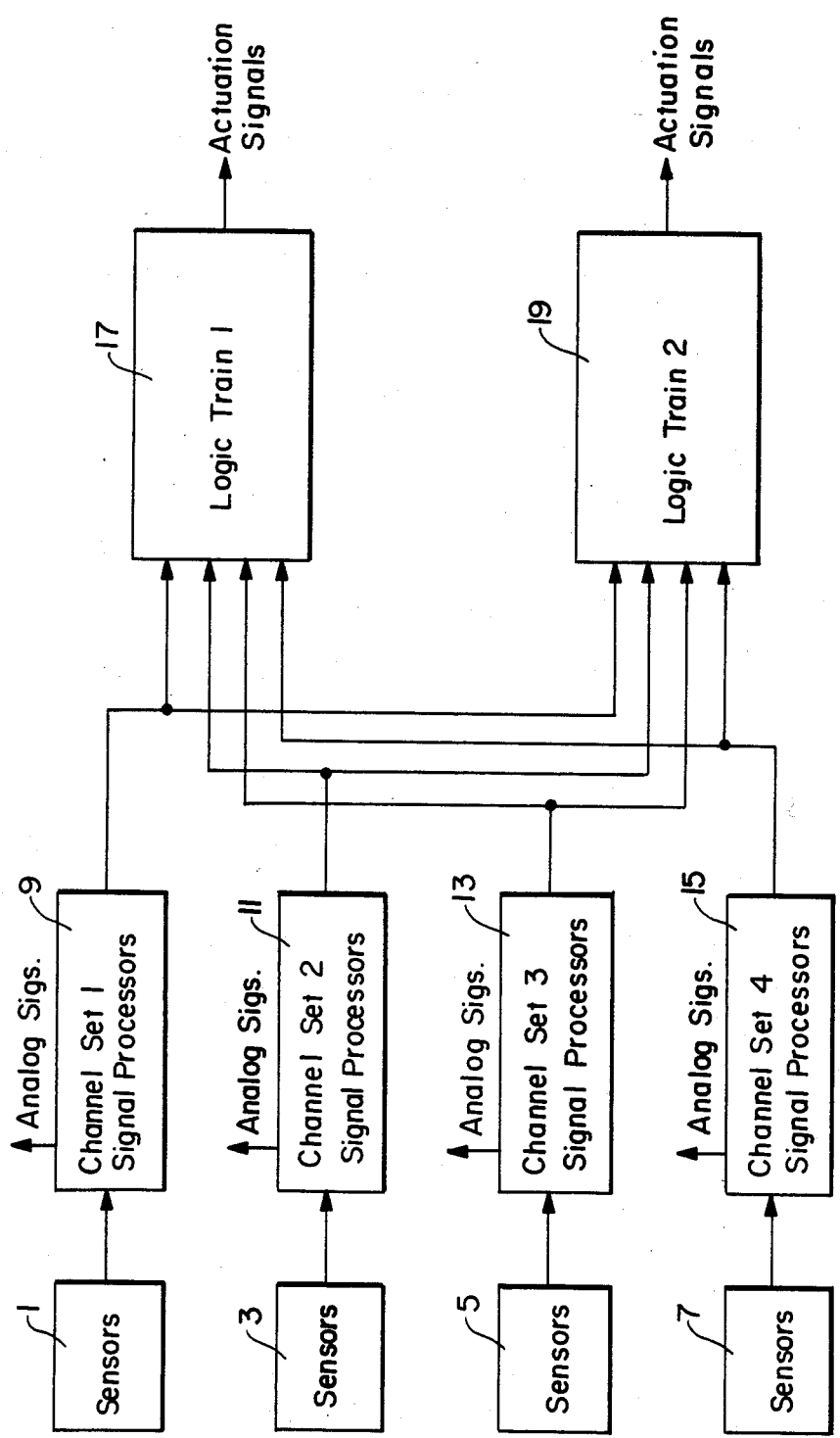
FIG. 1 is a schematic diagram in block form of a protection system for a pressurized water reactor nuclear power plant incorporating the present invention.

While the invention has application to signal processing for a wide variety of complex processes in which signals from a large number of sensors measuring selected process parameters are processed, it will be described as applied to a pressurized water reactor (PWR) nuclear power plant. As shown in FIG. 1, redundant groups of sensors, for example four, identified generally by the reference characters 1, 3, 5 and 7, monitor selected parameters, including temperatures, pressures, flows, fluid levels, radiation levels, the status of pumps and valves, et cetra, throughout the plant in a manner well-known in the art. As mentioned previously, each group of sensors will not always include sensors monitoring all the same parameters especially where the sensors are particularly expensive, but even in these instances, electrically isolated signals from these sensors usually will be provided for redundant processing. Each group of sensors 1, 3, 5, and 7 generates signals which are processed by associated signal processors 9, 11, 13 and 15 respectively. The sensors and associated signal processors form channel sets which are labeled numerically 1 through 4 in the example.

Processing of the sensor signals by the associated signal processors 9, 11, 13 and 15 of each channel set includes a comparison of the value of the signal with a selected limiting value. If the limiting value is exceeded, a digital partial protection system actuation signal is generated. The partial actuation signals generated by each channel set are each applied to two identical logic trains 17 and 19 which individually generate protection system actuation signals based upon selected voting logic. For instance, if two out of four voting logic has been selected, two out of the corresponding four partial actuation signals must be present in order to generate the actuation signal. These protection system actuation signals include trip signals which open the breakers supplying power to the under voltage coils on the reactor rod control system to shut down the reactor, and engineered safeguard actuation signals which initiate such action as activating the emergency boron injection system, turning on the containment spray, et cetra, as conditions warrant. The voting logic, the tripping of the reactor and the operation of the engineered safeguard systems is well-known in the art.

The signal processors 9, 11, 13 and 15 also generate a number of redundant analog signals representative of the on-line value of selected process parameters. These analog signals may be used by the reactor control system to regulate plant operation, by the surveillance system to monitor plant operation, and, if provided, by a post accident monitoring system to appraise supervisory personnel of the condition of the plant and the effect of mitigation actions taken following an accident. A selected set of the analog signals may be used for one or more the these purposes, or the four sets of signals can be further processed to generate a mean value, or a most reliable value, using known techniques which are independent of the present invention.

Figure 2:
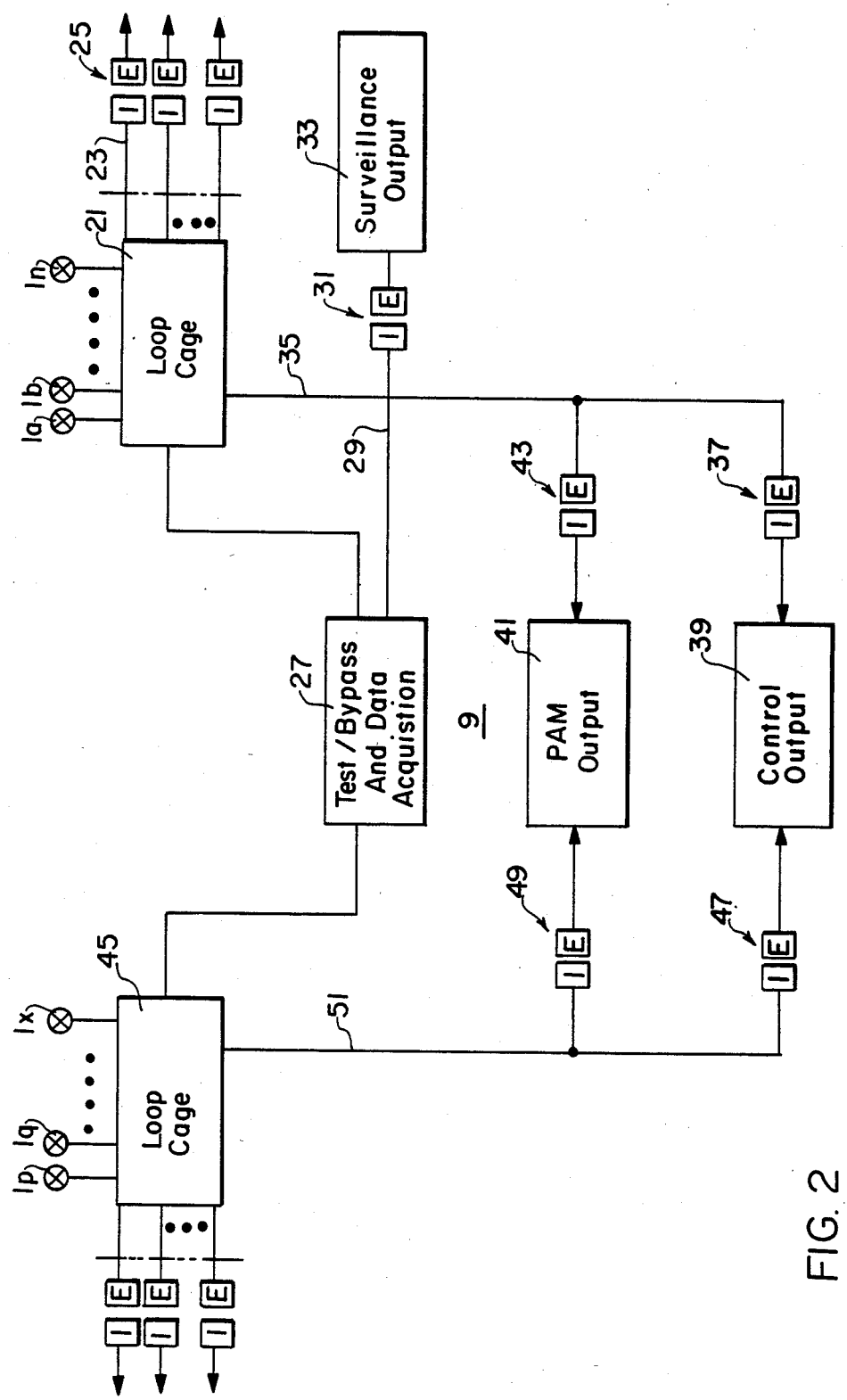
FIG. 2 is a schematic diagram in block form of one channel set of the protection system disclosed in FIG. 1.

FIG. 2 illustrates the organization of the signal processor 9 in channel 1 and is typical of the signal processor in each channel. The signal processor includes a loop cage 21 which in turn, includes a number of microcomputers as will be discussed in detail below. Signals from the numerous sensors 1 of channel 1 are applied to the microcomputers of loop cage 21 to generate a number of digital partial protection system actuation signals which are individually outputted to the logic trains 17 and 19 on lines 23. In each of the lines 23 is an isolation device 25 which provides class 1E protection grade isolation for the associated signal. A test/bypass and data acquisition unit 27 tests the microcomputers and other components of the loop cage 21 and gathers and stores the analog parameter signals generated by the microcomputers for serial output over a data link 29 through a common class IE isolation device 31 to a surveillance output system 33. Certain of the analog signals are also transmitted by a data link 35 through a common class lE isolation device 37 to a reactor control system output 39. The data link 35 also supplies these analog signals, if desired, to a post accident monitoring system 41 through a single Class 1E isolation device 43.

A second loop cage 45 can be provided where additional microcomputers are required to process all of the sensor signals 1. Each of the additional digital partial protection system actuation signals generated by additional microcomputers is outputted to the logic trains 17 and 19 through a line 23 with its own protection grade isolation 25. Similarly, the analog signals generated in the second loop cage are transmitted to the reactor control system 39 and the PAM system 41 through isolation devices 47 and 49 respectively by a data link 51.

Figure 3:
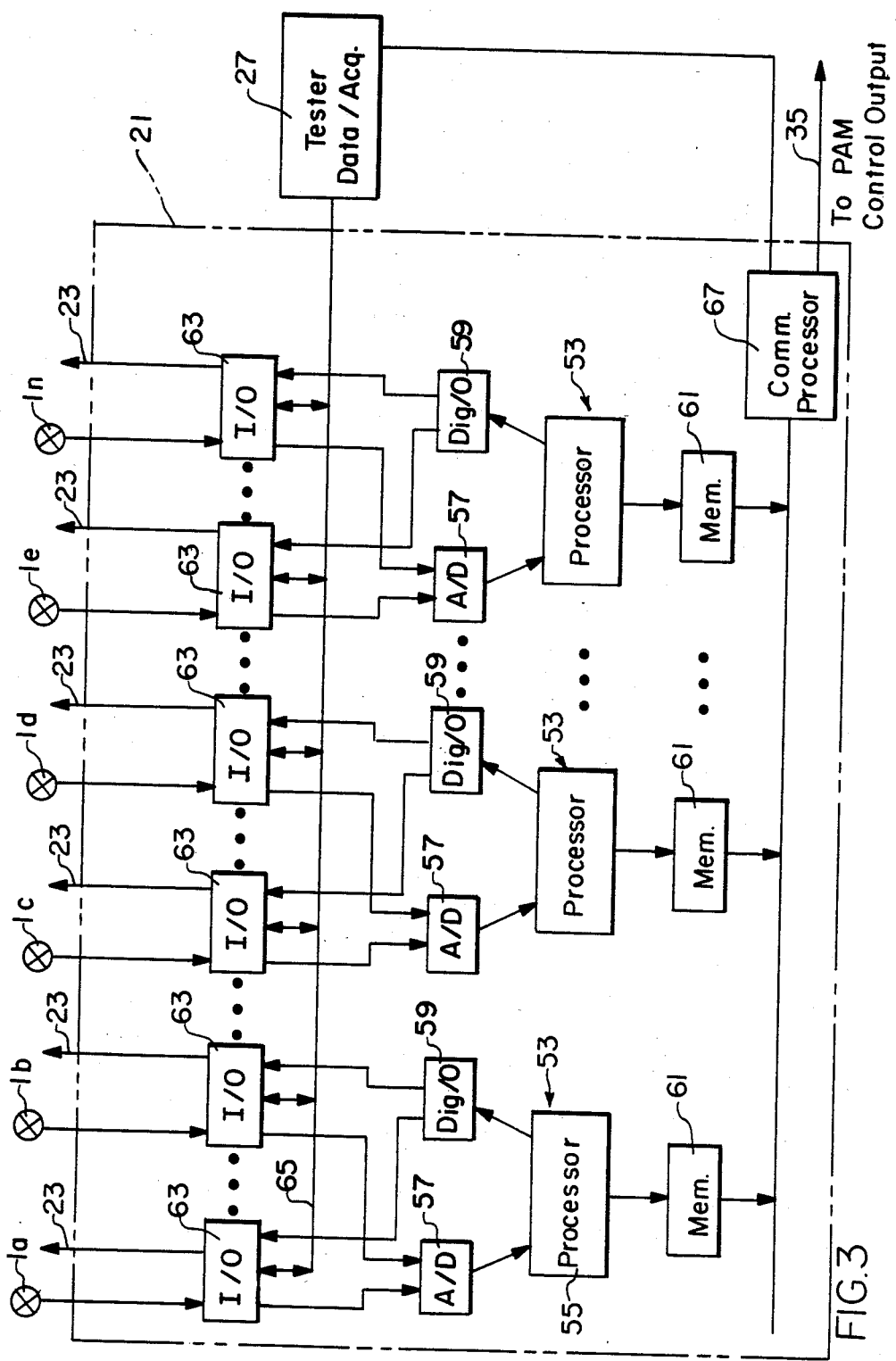
FIG. 3 is a schematic diagram in block form of the details of a loop cage which forms a portion of the channel set shown in FIG. 2.

The arrangement of the microcomputer in the loop cage 21 is illustrated in FIG. 3. Each microcomputer 53 includes a processor 55, an alalog to digital input device 57, a digital output interface 59, and a memory 61. A suitable microcomputer is the Intel SBC 88/40 with an Intel SBC 337 math coprocessor. This combination provides a complete computer system on a single 6.75 by 12 inch printed circuit board. The board provides an APX 88/2 microprocessor/coprocessor combination, 16 differential analog inputs, three timers, 24 lines of parallel I/0, $E^2PROM$ support, and a kilobyte of dual ported RAM.

Associated with each microcomputer 53 are a number of input/output boards 63 to which the signals from the sensors 1 are applied and from which the output lines 23 with their protection grade isolation devices 25 extend. Each input/output board 63 is connected to the test/bypass data acquisition unit 27 by a bus 65. Signals on the bus 65 control the application of the sensor signals and test signals to the A/C converter interface 57 of the microcomputer and the application of the digital protection system actuation signal from the digital output interface 59 to the output line 23. As will be seen, the bus 65 also transmits the digital test response signals to the tester 27.

The signals representative of the analog parameters generated by the microcomputer 53 are stored in the memories 61. A common communications processor 67 controls the sequential transmission of the stored signals by the data link 35 to the reactor control system and the post accident monitoring system. The analog signals are also transmitted to the test/bypass data acquisition unit for output to the surveillance system and for verification during test.

Figure 4:
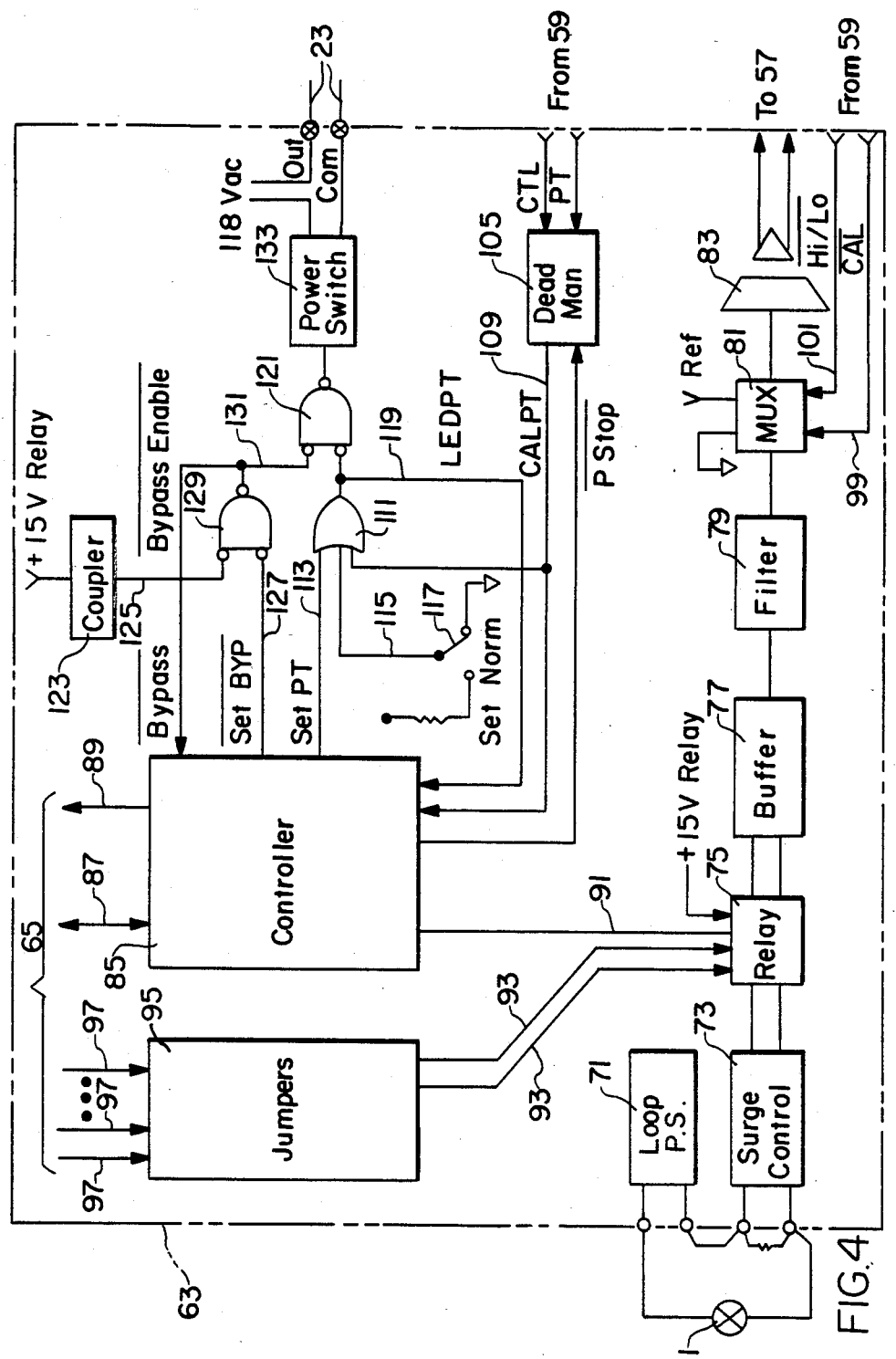
FIG. 4 is a schematic diagram of one of the input/output boards which are found in the loop cage illustrated in FIG. 3.

FIG. 4 illustrates the details of one of the input/output boards 63 for the microcomputers 53. Each board 63 includes analog input circuits which have a pair of differential input terminals 69. A loop power supply 61 is available for current transmitter type sensors 1 as shown, but is not needed with voltage type sensor signals. Each board has two such analog input circuits although when the sensors are resistance temperature detectors (RTDs) both inputs are needed to drive and monitor the output of a single RTD. The analog sensor signal passes through a surge control circuit 63, which protects the other components on the input/output board 63 and the associated microcomputer from large transients in the field signal, and is applied to normally closed contacts of a test relay 75. With the test relay 75 deenergized, the analog signal is applied to a buffer 77 which isolates the sensor from the reaction of the downstream components and converts the differential signal into a single ended signal. The signal ended analog signal is then passed through a low pass filter 79 with Butterworth characteristics which eliminates noise before being applied to a multiplexer 81. Under normal operating conditions, the multiplexer 81 passes the analog signal through an electrical isolation circuit 83 to the analog to digital converter 57 input of the microcomputer 53.

The input/output board 63 also includes a controller 85 which receives instructions from, and sends information to, the test/bypass data acquisition unit 27 over the bus 65 which includes a full duplex serial communications bus 87 and a real time digital response bus 89. In response to a signal from the tester 27 to test a particular one of the protection system actuation functions, the controller 85 energizes the test relay 75 associated with the appropriate analog input signal by sending a control signal over a lead 91. Testing of a particular protection function may entail the energization of the test relay 75 associated with only one analog input or may require energization of both test relays on the board where the selected function is dependent upon both analog inputs. In fact, protection functions which are dependent upon more than two analog inputs will require the controllers on other boards to simultaneously energize the appropriate test relays. The test relays cannot be energized, however, in the absence of a "+15 volt relay" signal which in effect is a test enable signal. This "+15 volt relay" signal, which provides the power for energization of the test relays, is generated by the closure of a manual switch (not shown). This switch, which simultaneously enables all of the test relays on all of the input/output boards in a given channel set, provides administrative control over the test procedure and permits a human operator to assure that only one channel set at a time is capable of beig put into test.

Energization of the test relay 75 by a signal from the controller 85 over lead 91 disconnects the field analog signal from the buffer 77 and substitutes a differential analog reference signal supplied on leads 93. The reference signal on lead 93 is selected by a jumper unit 95 from among 16 analog reference signals supplied by the test/bypass data acquisition unit 27 on a cable 97 which forms a part of the bus 65 and is daisy chained between all of the input/output boards 63 in the channel set. The 16 analog reference signal lines provide the capability of testing protection functions which are dependent upon multiple analog input signals.

The multiplexer 81 provides the microcomputer 53 with the capability of automatically, repetitively calibrating the isolation circuit 83 and the analog to digital converter 75. Cyclically during its operation, the microcomputer generates a $\overline{CAL}$ signal on lead 99 which disconnects the filtered analog signal from the isolation circuit 83 and substitutes a calibration reference signal. When a Hi/$\overline{LO}$ signal generated by the microcomputer on a lead 101 is active, a calbirating reference signal V$_{ref}$, preferably having a value at the upper end of the range of the analog to digital converter 57, is applied to the isolation citcuit 83. When this Hi/$\overline{LO}$ signal is inactive, ground is used as the calibrating signal. Ideally, the calibration would include all of the signal conditioning for the analog inputs. Unfortunately, the surge protection circuit 73 introduces a significant time constant into the signal conditioning. Because of time constraints, this prohibits dynamic calibration of the entire conditioning circuit.

The microcomputers 53 apply compensation derived from the self-calibration signals to the analog field signals, read them, scale them, compare them to alarm and caution limits, perform the functional calculations, create the partial trips and partial engineered safeguard actuations, and store analog parameter signals in their dual port memories 61 for eventual transmission to the analog output devices under control of the communications processor 67. The partial protection system actuation signals, which include the partial trips and the partial engineered safeguard actuation signals, are transmitted by the digital output device 59 to an input/output board 63 in the form of a control signal, CTL, on a line 103. The CTL signal is applied to a deadman circuit 105 together with a pulse train signal, PT, which is generated during the normal cyclic operation of the microcomputer 53 and is provided by the digital output device 59 on line 107. The deadman circuit 105 passes the control signal, CTL, on as the calculated partial trip signal, CALPT, on line 109 and monitors the PT signal. If the pulse train signal, PT, is interrupted for a period of time indicative of a failure within the microcomputer 53, the deadman circuit times out and generates a partial actuation signal on line 109 regardless of the state of the CTL signal. The operation of the deadman circuit 105 can be tested by a $\overline{PSTOP}$ signal supplied by the controller 85 on line 110.

The calculated partial trip signal, CALPT, is logically ored in OR gate 111 with a manual partial trip signal, SET PT, generated remotely on line 113 by the operator through the test/bypass and data acquisition unit 27 and controller 85, and a local manual partial trip signal generated on line 115 by an onboard switch 117. The output of gate 111 on line 119 is a signal LEDPT which is applied to an AND gate 121 and to the controller 85. The controller 85 transmits the partial trip signal through the tester/bypass unit 27 to a light emitting diode (LED) on the operator's console as notification of the generation of a manual or automatic partial actuation signal. This LEDPT signal also provides to the test/bypass and data acquisition unit 27 the indication of the generation of the partial actuation signal in response to the appropriate analog reference signals during the automatic test. This signal is transmitted to the test unit 27 over the digital response real time bus 89 so that the tester may evaluate the time reuired for the microcomputer to generate the partial actuation signal as part of the test sequence.

As previously mentioned, the partial actuation signal (LEDPT) is bypassed during test so that if a corresponding partial actuation signal is already being generated in another channel set, due for instanct to a faulty sensor, the reactor is not tripped or the associated engineered safeguard system is not actuated based upon the two out of four voting logic. As also discussed above, a partial actuation signal can only be bypassed if the operator has given his consent to a bypass in that channel set and that particular partial actuation signal has been selected for test. The operator's consent is effected by the active state of the "+15V relay" signal which is passed through an opto-coupler/level shifter 123 to generate a $\overline{BYPASS\ ENABLE}$ signal on line 125 which is protection grade electrically isolated from, and inverted with respect to, the "+15V relay" signal. The specific partial actuation signal to be bypassed is identified by the low state of a $\overline{SET\ BYP}$ signal generated on a line 127 by the controller 85 in response to a signal sent by the test/bypass unit 27 over the communications link 87. The $\overline{BYPASS\ ENABLE}$ and $\overline{SETBYP}$ signals are applied to the inputs of a low true logic AND gate 129 to generate on line 131 a $\overline{BYPASS}$ signal which is applied as the second input to AND gate 121 and is also fed back to the controller 85 for verification. Unless both the $\overline{BYPASS\ ENABLE}$ and the SET BYP signals are low, the output of the gate 129 will be high to enable AND gate 121 and thereby allow a partial actuation signal to be passed through to the power switch 133. The power switch can be arranged to either complete or open the circuit between the 118 vac source and the output lines 23 in response to a partial actuation signal. For the partial trip signals, power switch 133 would be configured to apply power to the leads 23 continuously in the absence of a partial trip signal and to interrupt power when the signal is present, thereby providing a fail safe mode of operation. In the case of some engineered safeguard systems, such as containment spray, where the response speed is not as critical, the power switch is arranged to energize the output lines 23 only in the presence of a partial actuation signal.

There are two digital output circuits like that just described on each input/output board 63, each of which generates a partial protection system actuation signal. In the case of some engineered safeguard actuations, a single safeguard function may result in the generation of more than one partial actuation signal. In such a case, all of the related partial actuation signals would be bypassed when that function was under test.

An important consideration of the invention is to maintain independence among the processing loops. There is complete separation between channel sets in that separate sensors, signal processing and isolated outputs are provided for each of the four channel sets. Within each channel set of the exemplary embodiment there are twelve indepedent microcomputers 53. While one approach would be to provide a separate microcomputer for each protection system actuation function, this is both uneconomical and unnecessary. There are too many actuation signals to be generated, typically about for a four loop PWR plant and the calculations to be performed are quite simple. Furthermore, the very nature in which digital computers operate provides separation between functions carried out in sequential fashion within the microcomputer. While this might imply that the ideal solution would be to provide a single digital computer to generate all of the protection actuation signals in a channel set, this approach is undesirable since a single failure in the digital computer could eliminate the entire channel set. The philosophy of the present invention is to distribute the protection function in each channel set over a number of microcomputers which each generate several protection system actuation systems so that loss of one microcomputer does not compromise the entire channel set. Additionally, the approach is to allocate the protection functions between the microcomputers in a channel set in a manner which mitigates the effects of a single failure. Since many of the protection loops are inherently coupled through the process, abnormal process conditions which would go undetected by a failed loop will show up in the related loop. In fact, it has been determined that for all of the postulated events for which a PWR protection system is designed, there is a primary loop for detecting the event and a secondary loop. It is a fundamental concept of this invention therefore, to identify the primary and secondary loops and assign them to different microcomputers in the channel set. Table 1 illustrates the manner in which the protection system functions in a four loop PWR plant can be allocated among the twelve microcomputers in one channel set. Such a plant has four steam generators all served by a common reactor through four interconnected reactor coolant loops. The following legend explains certain abreviations used in Table 1:

| | |
|---|---|
| * | assigned microcomputer |
| FW | feedwater |
| RC | reactor coolant |
| RT | reactor trip |
| RWST | refueling water supply tank |
| SI | safety injection |
| ST | steam |
| WR | wide range |

TABLE I

| Functions | Microcomputer | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Low RC Flow - RT | | | | | | | | | | | | |
| Loop 1 | * | | | | | | | | | | | |
| Loop 2 | | * | | | | | | | | | | |
| Loop 3 | | | * | | | | | | | | | |
| Loop 4 | | | | * | | | | | | | | |
| Pressurizer Pressure | | | | | | | | | | | | |
| Lo Pressure - RT | * | | | | | | | | | | | |
| Lo Pressure - SI | * | | | | | | | | | | | |
| SI Interlock | * | | | | | | | | | | | |
| HI Pressure | * | | | | | | | | | | | |
| Pressurizer Level | | | | | | | | | | | | |
| HI Level - RT | | * | | | | | | | | | | |
| Steam Generator 2 | | | | | | | | | | | | |
| HI HI Level - RT | | | | * | | | | | | | | |
| LO LO Level - | | | | * | | | | | | | | |
| Steam Generator 3 | | | | | | | | | | | | |
| HI HI Level - RT | | | | | * | | | | | | | |
| LO LO Level | | | | | * | | | | | | | |
| $T_{AVG}$ - T | | | | | | | | | | | | |
| LO $T_{AVG}$ FW ISOL | | | | | | * | | | | | | |
| LO-LO $T_{AVG}$ Logic | | | | | | * | | | | | | |
| Turbine Runback | | | | | | * | | | | | | |
| Overpower T-Trip | | | | | | * | | | | | | |
| Turbine Runback | | | | | | * | | | | | | |
| Over Temp T-Trip | | | | | | * | | | | | | |
| Steam Generator Mismatch | | | | | | | | | | | | |
| Loop 1 | | | | | | | | | | | | |
| Alarm | | | | | | | | * | | | | |
| Mismatch RT | | | | | | | | * | | | | |
| Mismatch SI | | | | | | | | * | | | | |
| Loop 2 | | | | | | | | | | | | |
| Alarm | | | | | | | | | * | | | |
| Mismatch RT | | | | | | | | | * | | | |
| Mismatch SI | | | | | | | | | * | | | |
| Loop 3 | | | | | | | | | | | | |
| Alarm | | | | | | | | | | * | | |

TABLE I-continued

| Functions | Microcomputer | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Mismatch RT | | | | | | | | | | * | | |
| Mismatch SI | | | | | | | | | | * | | |
| Loop 4 | | | | | | | | | | | | |
| Alarm | | | | | | | | | | * | | |
| Mismatch RT | | | | | | | | | | * | | |
| Mismatch SI | | | | | | | | | | * | | |
| Containment Press | | | | | | | | | | | | |
| HI Pressure - Spray Actuation | | | | | | | * | | | | | |
| RWST Level | | | | | | | | | | | | |
| LO Level Interlock | | | | | | | | | | * | | |
| Containment Sump | | | | | | | | | | | | |
| High Level | | | | | | | | | | * | | |
| WR TC Temp (Hot Leg) | | | | | | | | | | | | |
| Loop 1 | | | | | | | * | | | | | |
| Loop 1 | | | | | | | * | | | | | |
| Loop 2 | | | | | | | | * | | | | |
| Loop 2 | | | | | | | | * | | | | |
| Turbine Impulse Chamber Pressure | | | | | | | | | | | | |
| ST Line Isol & SI | | | | | | | | | | | | |
| Loop 1 | | | | | | | | | | * | | |
| Loop 2 | | | | | | | | | | * | | |
| Loop 3 | | | | | | | | | | * | | |
| Loop 4 | | | | | | | | | | * | | |
| Boric Acid Tank Level | | | | | | | * | | | | | |
| RC Loop 3 & 4 WR Pressure | | | | | * | | | | | | | |

While it may be noted that partial reactor trips for steam genertor high water levels are only generated in the illustrative channel set for steam generators 2 and 3, one other channel set would also generate redundant trips for these steam generators, and the remaining channel sets generate corresponding redundant partial trips for steam generators 1 and 4. A similar allocation is made for reactor coolant wide range pressure.

An an illustration of the principals of the invention embodied in the assignment of protection functions in the example of Table 1, it will be recalled that the primary indication of a break in the reactor coolant piping is a drop in coolant pressure and a secondary indication is a change in coolant temperature. As seen from the example of Table 1, the pressurizer pressure partial trip and safety injection partial actuation signal are generated in microcomputer number 1 while the coolant temperature partial protection system actuations are generated by microcomputer number 4. It should also be noted that steam generator mismatch protection system partial actuation signals for loops 1 through 4, any one of which could also initiate emergency action for the postulated event, are generated in microcomputers 6, 7, 10 and 11 respectively. It should be understood that the allocation of protection functions to individual microcomputers within a channel set shown in Table 1 is not a unique solution within the teachings of the invention even for a four loop PWR power plant.

The software for each of the microcomputers 53 takes the form of a system initialization followed by a continuous loop and is always in one of the following several states: primary initialization, parameter set, secondary initialization, run and error. Considering each of these states in order, upon power-up or reset the microcomputer or loop processor enters the primary initialization state. The reactor partial trip signals and the engineered safeguard partial actuation signals are each set to their safe state. The processor then performs extensive power-up diagnostic tests. Upon successful completion of the tests, the processor enters the Parameter Set State if a parameter set enable signal is active, otherwise it enters the secondary initialization state. The Parameter Set State, which can only be entered from the primary initialization state, allows the loop processor to accept commands from the communications processor 67. It is used to change caution and alarm limits, I/0 module calibration constants, engineering unit conversion constants and tuning constants. Access is limited under administrative control and commands are only accepted from the communications processor if the loop processor is in the Parameter Set State. The loop processor first establishes communications with the communications processor before accepting commands. The majority of the commands are requests to change E²PROM constants. When the loop processor requests an exit from the Parameter Set State, it returns to the Primary Initialization State.

The Secondary Initialization State is the final preparation for operation. The functional algorithms and the real time interval timer are initialized. The loop processor then enters the Run State which is the normal operating mode. It consists of a continuous loop performing the following functions:

1. Input Scan - performs analog input, error compensation, engineering units conversion and limit checking.
2. Functional Calculations - performs numeric algorithms, and immediately sets partial trip and engineered safeguard.
3. Communications - If communications exist with the communication processor, and the previous transaction is complete, it builds the next data block for the stored analog parameters and passes it on to the communication processor. If communication does not exist, an attempt is made to establish communication. Under no circumstances is the processor permitted to hang up in the communication routines.

4. Mandatory Diagnostics - A number of on-line diagnostics are performed including numeric data processor tests.

5. Real Time Interval Synchronization - The interval timer is read; if it is not close to expiration, additional diagnostics are performed. When expiration is imminent, the loop processor will wait and poll the timer until expiration occurs. The continusou loop is then restarted.

When the loop processor detects an internal error, it enters the Error State. All partial trips and engineered safeguard actuation outputs are placed in a safe state, and an error code is communicated to the communication processor. If communication does not exist, the loop processor will continually attempt to establish communication. The loop processor stays in the Error State until reset.

As previously mentioned, the communication processor communicates with each loop processor in the loop cage. The purpose of the communication is two-fold. First, during normal operation, the loop processor serves a data acquisition function in addition to the protection function. All input points are converted to engineering units, compared to limits, and made available to the communication processor. The communication protocol is simplex because the data flow is strictly out of the loop processor. This function is also used during system test and calibration. Since the loop processor does not know that a test is in progress, the normal operating mode will be verified. Second, the communication facility is used to change parameters and setpoints. This communication is half duplex; the loop processor receives commands requesting parameter changes and responds accordingly.

Care is taken to maintain the functional independence of the loop processors. Specifically, they do not stop, waiting for communication, and parameter change is a strictly controlled, off-line function. The first consideration, avoidance of waiting situations, is easily addressed. The status of the communication is checked every cycle. One attempt is made to service the communication. Whether this is successful or not, the processor proceeds with normal operation. The second consideration, strict control of parameter change, is also addressed by the communication scheme. Parameter change is only permitted when the loop processor is in the Parameter Set State. Effort is required to enter this state. A hardwired digital signal "Parameter Set Enable" must be activated and the loop cage must be reset. The communication processor must also be in a specific state to allow half duplex communication.

The test/bypass and data acquisition unit 27 services as a focal point for communication with plant personnel as well as with other plant surveillance systems. An extensive human-engineered automatic test capability is provided which adds to both system and plant availability and reduces the effort required by plant personnel to keep the system operating as required by technical specifications. The test unit is also used to set and verify parameters in the loop subsystems.

The tester 27 communicates the parameter changes to the loop subsystems communication processors 67 via a serial data link. The tester 27 also interfaces to the individual microcomputers I/0 units 63 through the bus 65. This test interface allows the tester to impress the test signals supplied by it on cable 97 to the analog inputs of the individual microprocessor in place of the field signals. During test, the digital output to the logic trains is bypassed in the manner discussed above. This automatically converts the voting logic on the tested function to two out of three. However, only the individual protection function is bypassed and the automatic test is completed very rapidly so that the function is off-line for only a very short interval. To verify that the test signal has been disengaged from the analog input upon completion of the test, it is set to an extreme value, and the analog value is then read via the serial data link through the communication processor. If the extreme value is read back by the tester 27, the interface has not disengaged.

The tester/bypass and data acquisition unit 27 also carries out additional tests on each microcomputer subsystem. The tester repetitively generates a ramp signal which is continuously applied as an analog input of each microcomputer. Each processor, in addition to cyclically performing calculations for the assigned protection functions, also calculates a test trip based upon a specified value of the ramp signal. The time interval required for the ramp signal to reach the specified value is much longer than the cycle time of the microcomputer. The test trip signal is transmitted to the tester over the digital response real time lead 89 so that the tester can evaluate as part of the test, the time required for the microcomputer to generate the test trip signal. If the test trip signal is not generated within a selected interval after the ramp signal reaches the specified value, an alarm signal is generated by the tester.

While specific embodiments of the invention have been described in detail, it will be appreciated by those skilled in the art that various modifications and alternatives to those details could be developed in light of the overall teaches of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for processing a plurality of signals produced by sensors monitoring selected parameters in a complex process for use by a process protection system, said apparatus comprising a plurality of independent, digital signal processors smaller in number than said plurality of sensor signals for generating digital protection system actuation signals for said protection system in response to predetermined combinations of values of said sensor signals indicative of predetermined conditions within said complex process, with at least some of said signal processors generating at least two such actuation signals and wherein for at least a given one of said predetermined conditions, a first of said independent signal processors generates a primary actuation signal for said given condition from a first combination of values of a first set of sensor signals and a second of said independent signal processors generates a secondary actuation signal for the given condition from a second combination of values of a second set of sensor signals, whereby although at least two protection system actuation signals are generated by at least some of said independent signal processors, the primary and secondary actuation signals indicative of a given predetermined process condition are generated in separate independent signal processors.

2. The apparatus of claim 1 wherein each of said independent digital, signal processors has a separate digital output line for transmitting each protection system actuation signal generated thereby to the process protection system, and wherein said apparatus includes electrical isolation means in each said digital output line to electrically isolate each digital signal processor from the process protection system.

3. The apparatus of claim 2 wherein each of said independent digital signal processors includes means for generating from the sensor signals applied thereto processed parameter signals representative of the analog value of selected parameters associated with said complex process, and wherein said apparatus includes, a common parameter signal output device, a common electrical isolation means, data link means connecting each of said independent digital signal processors with said common parameter output device through said common electrical isolation means, and a communications processor for controlling said data link means to sequentially transmit the parameter signals from each of said independent digital, signal processors to said common parameter signal output device through said common electrical isolation means.

4. The apparatus of claim 3 including a second parameter signal output device and a second common electrical isolation means and wherein said data link means transmits said processed parameter signals to said second parameter signal output device through said second common electrical isolation means under the control of said communications processor.

5. The apparatus of claim 3 including a second data link means, a second common electrical isolation means and a second communications processor and wherein said plurality of independent, digital, signal processors are divided into two groups with those in the first group connected to said common parameter signal output device by the first mentioned data link means through the first mentioned common electrical isolation means controlled by the first mentioned communications processor and those independent, digital signal processors in the second group are connected to said common parameter signal output device by said second data link means through said second common electrical isolation means under the control of said second communications processor.

6. The apparatus of claim 2 for use in processing redundant sets of signals produced by multiple sensors monitoring the selected parameters in the complex process and wherein said plurality of independent, digital, signal processors constitutes a channel set which processes one set of said redundant sensor signals and wherein said apparatus includes redundant channel sets each comprising a plurality of independent, digital, signal processors which process a set of said redundant sensor signals.

7. The apparatus of claim 6 wherein each of said independent, digital, signal processors includes input/output means for receiving said sensor signals required for said signal processor to generate said protection system actuation signals and for generating an active signal on each output line which goes inactive in response to the associated actuation signal, and wherein each channel set includes a common tester/bypass means which includes means for individually and sequentially as to each actuation signal replacing with selected actuating generating test signals at the input/output means only the required sensor signals for that actuation signal and for disconnecting only the actuation signal generated by the test signal from the associated output line and applying it instead to said test/bypass means, and means for sensing and recording the actuation signal generated by said test signal, whereby each actuation signal is individually bypassed by the generation of a continuous active signal on the associated output line when it is under test.

8. Apparatus for processing for use in a process protection system and a process control or monitoring system signals generated by a plurality of redundant sets of sensors monitoring selected parameters in a complex process comprising: multiple channel sets for separately processing each set of redundant sensor signals and each including; a plurality of independent, digital, signal processors for generating from selected sensor signals of the channel set protection system actuation signals indicative of predetermined conditions within said complex process with at least some of said signal processors generating more than one actuation signal but with related actuation signals indicative of the same condition generated in different signal processors, and for generating from said sensor signals processed parameter signals representative of the analog value of selected parameters within the complex process; input/output means for said digital signal processors including means for receiving the sensor signals required by the signal processor to generate the assigned actuation signals and processed parameter signals and means for connecting each of the actuation signals to a separate electrically isolated output line; common tester/bypass means for sequentially one at a time as to each actuation signal, replacing the required sensor signals with test signals which generate an actuation signal and for disconnecting the actuation signal from the output line and applying it to the tester/bypass means instead for sensing and recording of the actuation signal/common parameter signal output means; a common electrical isolation means; common data link means connecting each of said independent digital, signal processors with said common parameter signal output means through said common electrical isolation means and a common communications processor for sequentially controlling the transmission of said parameter signals by said data link means from said independent, digital signal processors to said common parameter signal output means through said common electrical isolation means.

9. The apparatus of claim 8 wherein said data link means are also connected to said tester/bypass means and wherein said communications processor also controls the sequential transmission of said parameter signals by said data link means from said independent, digital signal processors to said tester/bypass means, and the tester/bypass means includes means for storing and outputting said parameter signals through a common additional isolation means.

10. The apparatus of claim 8 wherein said independent, digital, signal processors in each channel set are divided into two groups, with those in each group transmitting their processed parameter signals by a data link means common to the group to one processed parameter output device common to the channel set through an electrical isolation means common to the group under the control of a communications processor also common to the group.

11. A method of processing signals generated by sensor monitoring selected parameters of a complex process using a plurality of independent, digital, signal procesors, said method comprising the steps of:

applying to each independent, digital signal processor, the sensor signals required for the generation of selected protection system actuation signals, some of which are a primary indication of the occurrence of a given event in the process requiring emergency action and others of which are a secondary indication of the occurrence of the given events, with sensor signals required for the generation of more than one of said selected actuation signals applied to at least some of said independent, digital, signal processors, but with the sensor signals required for the generation of the primary actuation signal and the secondary actuation signal for a given event applied to different independent, digital, signal processors;

operating the independent, digital signal processors to generate the selected actuation signals in response to the predetermined values of the applied sensor signals; and applying each of said actuation signals to a separate output line separately electrically isolated from the signal processor in which it is generated.

12. The method of claim 11 including the steps of sequentially, one at a time, as to each protection system actuation signal, disconnecting the actuation signal from its separate output line, removing the sensor signals required for the generation of the actuation signal from the associated independent, digital signal processor to which they are applied and substituting therefore test signals selected to generate the actuation signal, and generating a test fail signal if an actuation signal is not generated by the independent, digital signal processor in response to the test signals, whereby each actuation signal is tested individually while the remaining actuation signals, including any generated by the same independent, digital signal processor as the actuation signal under test, remain on line.

13. The method of claim 11 wherein the step of operating said independent, digital, signal processors includes generating from the applied sensor signals and storing processed parameter signals indicative of the analog value of selected process parameters, and sequentially one at a time transmitting each of said stored processed parameter signals over a data link to a common processed parameter signal output device through a common electrical isolation means.

14. A method of processing signals generated by redundant sets of sensors monitoring selected parameters in a nuclear fueled electric power generating plant using a plurality of independent, digital, signal processors, said method including the steps of:

applying the sensor signals in each redundant set of sensor signals to a separate group of said independent, digital, signal processors to form redundant channel sets, and within each channel set applying to individual independent, digital, signal processors the sensor signals required to generate within said signal processors selected partial protection system actuation signals, some of which are a primary indication of a given event in the plant requiring emergency action and others of which are a secondary indication of the given event, with sensor signals required to generate the primary actuation signal and the secondary actuation signal for a given event applied to separate independent, digital, signal processors within the channel set;

operating the independent, digital, signal processors in each channel set to cyclically generate the selected partial actuation signals in response to predetermined values of the applied sensor signals; and applying each of said partial actuation signals to a separate output line separately electrically isolated from the signal processor in which it is generated.

15. The method of claim 14 including the steps of repetitively for each channel set generating a ramp signal, continuously applying said ramp signal to each of said independent, digital, signal processors in the channel set, operating each of said signal processors to cyclically generate, along with the generation of said partial protection system actuation signals, a test actuation signal when said applied ramp signal reaches a preset value, the time interval required for said repetitive ramp signals to reach said preset value being longer than the interval required for the signal processors to generate all of its assigned partial actuation signals and the test actuation signal, monitoring each signal processor for the generation of the test actuation signal and generating an alarm signal if said test actuation signal is not generated by a signal processor when the ramp signal reaches the preset value.

16. The method of claim 15 wherein the step of applying each partial protection system actuation signal to a separate output line includes generating a signal having a first level on the output line in the absence of the associated actuation signal and generating signal having a second level on the output line in the presence of the actuation signal; and including the steps of sequentially, one at a time as to each actuation signal in only one channel set, removing the sensor signals required to generate that actuation signal from the associated independent, digital, signal processor and replacing them with test signals having values selected to generate said actuation signal, disconnecting the actuation signal from the associated output line so that the signal having the first level remains on that output line, applying the actuation signal instead to a tester/bypass device which generates a test fail signal if the actuation signal is not generated in response to the test signals, removing the test signal from the signal processor and reapplying said sensor signals to the signal processor and said actuation signal to the output line, whereby only one actuation signal in one channel set at a time is tested and during the sequential testing the actuation signal is effectively bypassed by the generation of the signal having said first level on the associated output line.

17. The method of claim 16 including after removal of each test signal from a signal processor, the steps of, maintaining the magnitude of the test signal at a value above that which would cause the signal processor to generate a partial protection system actuation signal, monitoring the signal on the associated output line, and generating an alarm signal if an actuation signal appears on said output line whereby a check is made to assure that the tester is disconnected from the signal processor following each test.

18. The method of claim 16 including the steps of operating said independent, digital, signal processors to generate from the applied sensor signals, parameter signals representative of the analog value of selected process parameters, storing said parameter signals in the associated signal processor, and as to each channel set; sequentially transmitting the stored parameter signals by common data link means, through a common electrical isolation means to a common parameter signal output device.

* * * * *